United States Patent Office 3,287,304
Patented Nov. 22, 1966

3,287,304
ACRYLONITRILE COPOLYMERS AND
COMPOSITIONS
Yoshisato Fujisaki, Numazu-shi, and Chozo Nakayama, Toshio Ohfuka, and Hideo Sato, Fuji-shi, Japan, assignors to Asahi Kasei Kogyo Kabushiki Kaisha, Osaka, Japan, a corporation of Japan
No Drawing. Filed Jan. 3, 1963, Ser. No. 249,131
7 Claims. (Cl. 260—29.6)

This invention relates to novel acrylonitrile copolymers and compositions which comprise about 80%–99.8% by weight of acrylonitrile, about 0.2%–5% by weight of α-sulfoacrylonitrile and 0% to about 19.8% of other ethylenically unsaturated compounds copolymerizable with acrylonitrile and α-sulfoacrylonitrile, and a method of producing the same.

In the production of acrylic fibers, it is most important to prevent milkiness (loss of transparency) and thermal discoloration of the fibers, which greatly reduce the commercial value of the fibers even when present to a minor extent. Excellent shade and brightness are required and demanded at all times. Many proposals have been made to prevent the milkiness and thermal discoloration of acrylic fibers but have not satisfied all requirements, and hence effective improvements were strongly needed.

It is an object of the present invention to provide new acrylonitrile copolymers and compositions from which acrylic fibers and shaped articles with substantial whiteness even after heat-treatment may be readily produced.

It is another object of this invention to provide new acrylonitrile copolymers and composition from which acrylic fibers and shaped articles may be produced which have no milkiness.

It is another object of this invention to provide acrylonitrile copolymers and compositions from which acrylic fibers and shaped articles dyeable to excellent shade and brightness may be readily produced.

It is a further object of this invention to provide a polymer having excellent dispersibility which makes polymerization easier and more advantageous without scaling, especially in continuous polymerization.

It is also an object of this invention to provide novel acrylonitrile copolymers and compositions which show excellent heat stretchability in the spinning process.

It is another object of this invention to provide a process of preparing shaped articles such as fibers, films etc., from the novel acrylonitrile copolymers and compositions.

Other objects of the present invention will be apparent from the description given hereunder.

According to the present invention, the acrylonitrile copolymers and compositions comprise about 80%–99.8% by weight of acrylonitrile, about 0.2%–5% by weight of α-sulfoacrylonitrile and 0% to about 19.8% by weight of other ethylenically unsaturated compounds co-polymerizable with acrylonitrile and α-sulfoacrylonitrile.

α-Sulfoacrylonitrile acts to reduce milkiness of acrylonitrile polymers. This is an unexpected property. Its action is remarkably seen in a solvent-coagulant system, especially in a system using nitric acid. It is assumed that some constitutional factor in α-sulfoacrylonitrile effects the balance between the polymer chain interaction and polymer-solvent interaction, thus suppressing the production of milkiness during the course of coagulation of the polymer gel.

The amount of α-sulfoacrylonitrile in the acrylonitrile copolymers and compositions should be more than about 0.2% by weight. Little effect in reducing milkiness is obtained with less than 0.2%.

Furthermore, α-sulfoacrylonitrile greatly improves the dispersibility of polymers produced in aqueous suspension polymerization systems, which is usually the case in polymerizing acrylonitrile copolymers containing more than 80% by weight of acrylonitrile. Thereby stirring of the material in a polymerizing vessel is easily effected and formation of scales on the wall of the vessel is greatly reduced. The amount of α-sulfoacrylonitrile should be more than about 0.2% by weight of the final polymeric composition. No salient effect may be seen with less than 0.2%.

Thermal stability of whiteness (thermal discoloration) of fibers produced from the present copolymers and compositions is reduced and inter-adhesion of fibers after drying in the spinning process increases when more than 5% be weight of α-sulfoacrylonitrile is used.

The above mentioned objects of this invention are accomplished by copolymers comprising about 80%–99.8% by weight of acrylonitrile, about 0.2%–5% by weight of α-sulfoacrylonitrile and 0% to about 19.8% of other ethylenically unsaturated compounds copolymerizable with both acrylonitrile and α-sulfoacrylonitrile, a mixture of said copolymers of more than two, a mixture of poly-α-sulfoacrylonitrile and polyacrylonitrile or copolymers of acrylonitrile and other ethylenically unsaturated compounds copolymerizable with acrylonitrile, or a mixture of copolymers comprising α-sulfoacrylonitrile, acrylonitrile and/or other ethylenically unsaturated compounds copolymerizable with both said compounds and poly acrylonitrile or copolymers of acrylonitrile and other ethylenically unsaturated compounds copolymerizable with acrylonitrile.

α-Sulfoacrylonitrile can be used as an acid or a salt. When used as a salt, a water soluble salt of sodium, potassium, magnesium, calcium, barium, aluminium, zinc or ammonium, or organic amine salt of methyl amine, ethyl amine, dimethyl amine, or tributyl amine are employed. The ethylenically unsaturated compounds include styrene, α-methyl styrene and their ring-substituted derivatives (p-methyl styrene, o-ethyl styrene, p-chloro styrene, p-nitro styrene, p-methyl α-styrene, etc.), acrylic acid, methacrylic acid, their alkyl esters (methyl acrylate, ethyl acrylate, propyl acrylate, butyl acrylate, methyl methacrylate, ethyl methacrylate, propyl methacrylate, butyl methacrylate, etc.), aryl esters and aralkyl esters, (phenyl acrylate, α-naphthyl acrylate, phenyl methacrylate, β-naphthyl methacrylate, benzyl acrylate, etc.), acrylamide, methacrylamide, and their N-substituted derivatives (N-methyl acrylamide, N-ethyl acrylamide, N-butyl acrylamide, N-methyl methacryalmide, N-ethyl methacrylamide, N-propyl methacrylamide, N,N-dimethyl acrylamide, N,N - diethyl acrylamide, N,N-diethylmethacrylamide, N,N-methyl ethyl methacrylamide, etc.), methacrylonitrile, ethacrylonitrile, and their homologues, unsaturated ketones such as methyl vinyl ketone, vinyl compounds such as vinyl chloride, vinyl acetate, chlorovinyl acetate, vinyl propionate, vinyl butyrate, vinyl stearate, etc., butadiene, vinylidene chloride, acrolein; itaconic acid, maleic acid, fumaric acid; monoalkyl esters, dialkyl esters, mono aryl esters, diaryl esters, mono aralkyl esters, diaralkyl esters, monoamides, diamides, mono N-alkyl amides, di-N-alkyl amides, and mono amide mono esters of itaconic, maleic, and fumaric acids (methyl itaconate, dimethyl itaconate, diethyl maleate, dipropyl fumarate, itacoamide, di-N-methyl itacoamide, etc.), vinylethyl ether, allyl alcohol, and methallyl alcohol.

Acrylonitrile polymers or copolymers comprising a major proportion of acrylonitrile with other ethylenically unsaturated compounds copolymerizable therewith, may be produced by a wide variety of conventional methods, for example suspension, emulsion, and solution polymerization. The polymerization medium is usually water, but an aqueous solution such as zinc chloride, sodium thiocyanate, nitric acid solution, organic solvent such as dimethyl formamide, ethylene carbonate, dimethyl sulfoxide or ordinary organic solvents such as benzene, heptane, alcohol may be used.

Graft copolymerization in which acrylonitrile together with or without ethylenically unsaturated compounds copolymerizable therewith are usually polymerized in the presence of poly-α-sulfoacrylonitrile and/or the water-soluble salts thereof which are prepared beforehand.

These methods generally involve the mixing of monomers and contacting them either batchwise, continuously or semi-continuously in the presence of free radical catalysts.

The pH of the polymerization system is usually between about 1.5 and 4.0. Below pH 1.5, the whiteness of fiber is not satisfactory and there arise corrosion problems with the equipment. Above pH 4.0, the thermal stability of the whiteness of fiber becomes unsatisfactory. The polymerization temperature varies depending upon the type and method of polymerization, but it is usually between 20°–80° C.

Poly-α-sulfoacrylonitrile may also be produced by any of the conventional polymerization methods as above mentioned, usually using water as the polymerization medium.

Suitable catalysts are persulfuric acid, perboric acid, and their salts of ammonium, or alkali; hydrogen peroxide; organic peroxides such as benzoyl peroxide, lauroyl peroxide, t-butylhydroperoxide, azo compounds such as α,α'-azo-bis-isobutyronitrile, redox catalysts such as sodium, potassium or ammonium persulfate-sodium, potassium or ammonium bisulfite; sodium, potassium or ammonium chlorate-sodium, potassium or ammonium bisulfite; sodium, potassium or ammonium hydroxynitrilo mono-sulfonate-sodium, potassium or ammonium bisulfite; sodium, potassium or ammonium hydroxynitrilo di-sulfonate-sodium, potassium or ammonium bisulfite, hydrogen peroxide-ferrous compounds; potassium, sodium or ammonium permanganate - oxalic acid; benzoyl peroxide - dimethyl aniline and other known catalysts for radical polymerization. If necessary, molecular weight modifiers such as mercaptanes (ethyl mercaptane, lauryl mercaptane, β-mercaptoethanol, thioglycolic acid, dithioglycol, etc.) alcohols (isopropyl alcohol, ethyl alcohol, methyl alcohol, etc.) and others, emulsifiers such as sodium, potassium or ammonium dodecyl benzene sulfonates, sodium, potassium or ammonium lauryl sulfates, cetyl pyridinium bromide, polyvinyl alcohol, methyl cellulose, etc., dispersing agents and other assisting agents such as amines may also be added.

The present copolymers and compositions may be fabricated into filaments by dry spinning procedures. They may also be wet-spun by extruding a solution of the copolymers or the polymeric compositions in a suitable solvent into a coagulating bath comprising a liquid which is inert to the copolymers or the polymeric compositions and an extractive for the spinning solvent. Solutions of from 5 to 25% of the copolymers or the polymeric compositions in the selected solvent may be used. Suitable solvents are N,N-dimethylformamide, ethylene carbonate, γ-butyrolactone, α-cyanoacetamide, N,N-dimethyl acetamide, dimethylsulfoxide, N-formyl morpholine, tetramethylene sulfoxide, succinonitrile, concentrated aqueous solutions of sodium thiocyanate or other salts of the same, concentrated aqueous solution of zinc chloride, and concentrated aqueous solution of nitric acid which preferably contains nitric acid more than 63% by weight and less than 0.001% by weight of nitrous acid and/or other oxide of nitrogen.

The coagulating bath may be, for example, a mixture of water and the spinning solvent, for example a mixture of water and dimethylformamide, or a mixture of water and dimethyl acetamide, or a mixture of water and sodium thiocyanate, or a mixture of water and zinc chloride, or a mixture of water and nitric acid or it may be glycerol, aliphatic di- or polyhydric alcohol, aromatic hydrocarbons such as benzene, lower alcohols such as butanol, a mixture of water and calcium chloride, a mixture of water and isopropanol, a mixture of water, zinc chloride and calcium chloride, or a mixture of water, nitric acid and calcium chloride, or a mixture of water, nitric acid and sodium nitrate etc.

The filaments formed in the coagulating baths are subjected to a stretching operation for improvement of their tensile strength and elongation. This stretching may precede or follow washing to remove residual spinning solvent, or it may be performed concurrently with washing.

Any suitable fiber stretching device may be used. The fibers may be stretched on godets at a comparatively low temperature, for example, from room temperature to 100° C. and subsequently stretched again at elevated temperatures, or they may be stretched at elevated temperature directly after leaving the coagulating bath. The stretching is performed to an extent of 4 to 20 times of the original length in hot water, saturated or unsaturated steam which has atmospheric or elevated pressure, or hot air, or between hot rollers or hot plates.

The stretched, oriented fibers may be stabilized by subjecting them to heat-treatment in a relaxed condition. The stretched fibers may be dried in the conventional way.

Instead of fibers, other shaped articles such as films, foils, sheets, casings tubes, rods, etc. may be made.

α-Sulfoacrylonitrile or salts thereof having the formula

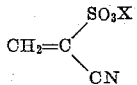

wherein X represents hydrogen or metals can be prepared by the process comprising sulfonation of β-chloropropionitrile with sulfuric anhydride and removal of hydrochloric acid from the resulting product, or the direct sulfonation of acrylonitrile with sulfuric anhydride in a inactive solvent such as dichloroethane. α-Sulfoacrylonitrile may usually be obtained in the form of a syrup but salts such as sodium, potassium, ammonium, calcium, barium, and the like can be obtained as colorless or pale yellow crystals or amorphous powder. All of these salts are soluble in water, insoluble in ether, slightly soluble in alcohol and liable to polymerize or decompose at elevated temperature, so their melting points cannot be measured.

This invention is further explained in conjunction with the examples below, but of course, the invention is not restricted by these examples.

The components of copolymers and compositions in the following examples are represented by percentage by weight and amounts of α-sulfoacrylonitrile and/or salts thereof are calculated as α-sulfoacrylonitrile.

*Example 1*

Into a 300 cc. flask equipped with a stirrer, a funnel, thermometer, and gas inlet and outlet with cock, were added 26.5 g. acrylonitrile and 133 g. dichloroethane, and cooled at a temperature below −10° C. Then 40 g. sulfuric anhydride was added dropwise from the funnel with stirring so as to control the temperature of the mixture not to use above 0° C. After adding sulfuric anhydride, the stirring was still continued for about 2 hours at a temperature from 0° to 5° C. Then, the resulting product was poured onto 300 g. ice and neutralized by 16% sodium hydroxide aqueous solution maintaining the temperature below 10° C.

After removing a dichloroethane layer from the water layer, the latter was left standing over night by cooling with ice. Sodium sulfate precipitated and was filtered off and, 735 g. pale yellow solution was obtained.

The concentration of the sodium salt of α-sulfoacrylonitrile was 3.52% (by means of bromine-analysis method), 33.4% in yield. Concentrating and drying at reduced pressure and at room temperature, 70 g. pale yellow powder was obtained. The product obtained by recrystallization of said powder from 98% ethylalcohol was 91% in purity (by means of bromine-analysis), and contained 8.8% nitrogen (theoretically 9.03%) and 20.1% sulfur (theoretically 20.6%).

*Example 2*

(A) Into a 30 l. polymerization vessel equipped with a reflux condenser, thermometer, and a gas inlet, were added 15 kg. water whose pH had been adjusted to 2.5 with sulfuric acid, 1 kg. acrylonitrile, 80 g. propyl methacrylate, 30 g. α-sulfoacrylonitrile, 40 g. ammonium persulfate, and 2 g. β-mercaptoethanol. Polymerization was carried out at 63° for five hours, and 980 g. polymer was obtained. The α-sulfoacrylonitrile content in the polymer was 21.1 g.

(B) The same example as in (A) was carried out without α-sulfoacrylonitrile. 980 g. of the polymer was obtained.

(C) The same as in (A), except that 60 g. vinyl sulfonic acid was used in the place of α-sulfoacrylonitrile, and 940 g. polymer was obtained. Vinyl sulfonic acid content in the polymer was 18.8 g.

mineralized water, 40 g. ammonium-persulfate, and 20 g. β-mercaptoethanol. pH was adjusted to 3.0 with sulfuric acid or sodium hydroxide. Polymerization was carried out in a nitrogen atmosphere at 63° g.' for 5 hours, and the resultant slurry was filtered, washed with water, dried at 70° C. for 20 hours. The yield of polymer was 90–94%. The polymer obtained was dissolved in 75% nitric acid at 0° C. at a concentration of 15 wt. percent, and the dope was spun, into 30% nitric acid. After washing with water, the fiber was heat-stretched by seven times in hot water at 98° C. and was dried at 70° C. for 5 hours. The properties of the resulting fibers are listed below. As the α-sulfoacrylonitrile content in the fiber is increased, transparency of fiber is improved, and therefore, the shade and brightness of the color of the dyed fiber is excellent. However, when its content is more than 5%, the fiber begins to inter-adhere in the course of the drying process and the whiteness of the fiber after the steaming process (10 minutes at 123° C.) is unsatisfactory.

| α-sulfoacrylonitrile content (wt. percent) | 0 | 0.18 | 0.21 | 0.53 | 1.1 | 3.8 | 5.2 | 5.5 | 6.4 |
|---|---|---|---|---|---|---|---|---|---|
| Degree of adhesion | None | None | None | None | None | None | Slight | Considerable | Considerable. |
| Milkiness | Considerable | Slight | Almost none | do | do | None | None | None | None. |
| Whiteness (Z value) | 89 | 90 | 92 | 95 | 94 | 92 | 90 | 88 | 86. |

The polymers obtained in (A), (B) and (C) were washed and dried and were respectively dissolved in 75% nitric acid at 0° C. at a concentration of 15%, and each of the resulting solutions was spun into 30% nitric acid solution, heat-stretched by 6 times in 100° C. hot water, allowed to relax in hot water at 83° C. The resulting fibers each was of 3 denier. When the heat-stretchability of these fibers obtained in (A), (B) and (C) were compared by their maximum heat-stretchabilities, they were 8.3 times for (A), 8.1 times for (B) and 6.3 times for (C). The fiber obtained in (B) was very milky, and the one in (A) was very transparent. When dyed with Sevron Red L, the former was dull while the latter yielded a brilliant red.

*Example 3*

(D) In a 150 l. polymerization vessel equipped with a stirrer, were placed 80 kg. of water adjusted to pH 2.0, 20 kg. acrylonitrile, 900 g. α-sulfoacrylonitrile, 60 g. α, α'-azobisisobutyronitrile, and 80 g. thioglycolic acid. Polymerization was carried out at 55° C. for 10 hours, and 19 kg. of polymer was obtained. The scaling on the walls of the polymerization vessel was relatively slight.

(E) The same operation as in (D) was effected, except without α-sulfoacrylonitrile, and 18.3 kg. of polymer was obtained. The scale of the walls of polymerization vessel was conspicuous.

(F) The same operation as in (D) was effected, except that 300 g. polyvinyl alcohol was used in the place of α-sulfoacrylonitrile. 18.1 kg. of the polymer was obtained.

Polymers (D) and (F) were snow white, but polymer (E) was slightly yellow. These polymers were dissolved in 75% nitric acid at 0° C., and each of the resulting solutions was spun into 30% nitric acid, heat-stretched to 7 times in water at 100° C. The fibers thus obtained were steamed at 123° C. for 10 minutes, and the fiber from (D) polymer did not practically change in whiteness, but the fibers from (E) and (F) polymers yellowed.

*Example 4*

In a 20 l. polymerization vessel equipped with a stirrer, reflux condenser, thermometer, and a gas inlet, were added 930 g. of acrylonitrile, 70 g. ethyl acrylate, an aqueous solution of α-sulfoacrylonitrile (the amount used is given in detail in the table below), 12 kg. of de- The degree of adhesion was measured by observation, and whiteness (Z value) was measured by a Hunter color and color difference meter with 1.5 g fiber sample stuffed in a cylinder with 38 mm. diameter and 100 mm. height.

*Example 5*

In the same polymerization vessel, as that in Example 4, were placed 915 g. acrylonitrile, 55 g. vinyl acetate, 30 g. of sodium salt of α-sulfoacrylonitrile, and 9.5 kg. of dimineralized water, and the pH of the mixture was adjusted to 3.0 with sulfuric acid. Purified nitrogen was passed over the surface of the solution. Sodium chlorate 4.0 g. and sodium bisulfite 16.0 g. were dissolved in 1 l. water and 9.1 g. sulfuric acid was dissolved in another 1 l. water. These solutions were continuously added to the polymerization vessel at the rate of 6.67 cc./min., and polymerization was carried out at 40° C. for 4 hours. The resultant slurry was filtered, washed with water, and dried at 70° C. for 20 hours. White polymer powder 780 g. was obtained. The intrinsic viscosity of the polymer measured in dimethyl-formamide at 35° C. was 1.62, and the polymer contained 4.8% vinyle acetate and 2.1% α-sulfoacrylonitrile. 180 g. of the polymer was dissolved in g. of distilled dimethylformamide at 50° C., deaerated, filtered, and was spun into 48% dimethylformamide at 25° C. The fiber was washed with water and heat-stretched to 8 times in hot water at 98° C., and finally dried at 70° C. for 5 hours. The resultant fiber was of 2.9 denier bright, lustrous white, and smooth. Even after steaming at 123° C. for 10 minutes, there was almost no deterioration in whiteness, and its shades were excellent when dyed with Sevron Red L., for example.

The same experiment as in Example 5 was carried out except that no sodium salt of α-sulfoacrylonitrile was added. The resultant fiber was milky and the shade of the dyed fiber with Eevron Red L. was dull.

*Example 6*

In the same equipment as that in Example 4 were placed 950 g. of acrylonitrile, 35 g. of methyl acrylate, 326 g. of 3.52% sodium salt of α-sulfoacrylonitrile aqueous solution, 11.6 kg. of water, 7.0 g. of ammonium persulfate, and 21.0 g. of sodium bisulfite. The mixture was adjusted to pH 3.0 with sulfuric acid and polymerization was carried out at 40° C. for 3 hours after the space air over the liquid in the polymerization vessel was replaced with nitrogen. 913 of white polymer, was obtained, which contained 94.9% acrylonitrile, 3.5% methyl acrylate, and 1.4% α-sulfoacrylonitrile (all by weight), and its intrinsic viscosity was 1.77 measured in dimethylformamide at 35° C. This polymer was dissolved in 60% zinc chloride aqueous solution to make 8.0% ploymer solution which was spun into a 29% zinc chloride aqueous solution at 35° C. The fiber was washed with water, heat-stretched to 15 times its original length in saturated steam of 1.5 kg./cm², and was finally dried at 70° C.

The fiber was of 3.1 denier, and almost no milkiness was observed. Its whiteness in Z value was 96, which decreased to 93 after steaming at 123° C. for ten minutes.

The same experiment as Example 6 was carried out except that no sodium salt of α-sulfoacrylonitrile was added. The resultant fiber was of 3.0 denier, and was fairly milky. It showed Z values of 95 and 87 before and after steaming at 123° C. for 10 minutes. It is obvious from these data that the presence of the sodium salt of α-sulfoacrylonitrile improves the resistance to thermal discoloration of the fiber.

*Example 7*

Into a 20 l. polymerization vessel, equipped with a stirrer, were continuously added the following substances at the specified rate so that the average retention time of polymer was made to be 6.5 hours. The temperature of the mixture was 55° C. Polymer was collected 24 hours after the initial charging, when the system reached an equilibrim. The collected polymer was filtered, washed with water, and dried.

|   | Parts |
|---|---|
| Acrylonitrile | 92.7 |
| Methyl methacrylate | 6.5 |
| Sodium salt of α-sulfoacrylonitrile | 0.8 |
| Sodium hydroxynitrilomonosulfonate | 0.8 |
| Sodium bisulfite | 2.4 |
| Sulfuric acid | 0.1 |
| Water | 1000 |

The yield of polymer was 85%, which contained 92.1% acrylonitrile, 7.3% methyl methacrylate, and 0.68% sodium salt of α-sulfoacrylonitrile. Intrinsic viscosity of the polymer was 1.40 (in dimethylformamide, at 35° C.). This polymer, 250 g., was dissolved in 1 liter of 70% nitric acid at −5° C., and the solution was degassed, filtered, and spun into 33% nitric acid. The fiber was washed with water, heat-stretched to 9 times in 0.01 N-sulfuric acid at 98° C., and was dried at 70° C. The fiber was of 2.8 denier and had a tensile strength of 4,2 g./denier., an elongation of 20%, and a ratio of dry and wet tensile strengths of 0.88. Transparency was excellent, and Z values before and after steaming were 99 and 98 respectively.

Sodium allylsulfonate was used in the place of sodium salt of α-sulfoacrylonitrile in Example 7, polymerization and spinning was carried out in the same way. Heat-stretchability of the fiber was poorer compared to that in Example 6, and occasional breakage of a single filament in the fiber flux were observed when it was stretched to 7 times. Dried fiber was fairly milky.

*Example 8*

The following substances were continuously charged at the specified rate into the same equipment as that in Example 7.

(A)

|   | Parts |
|---|---|
| Acrylonitrile | 89.0 |
| Methyl acrylate | 10.0 |
| Sodium salt of α-sulfoacrylonitrile | 1.0 |
| Sodium hydroxynitrilomonosulfonate | 0.8 |
| Sodium bisulfite | 2.4 |
| Sulfuric acid | 0.1 |
| Water | 1000 |

Retention time: 6.5 hours; temperature: 55° C.

(B)

|   | Parts |
|---|---|
| Acrylonitrile | 95.2 |
| Sodium salt of α-sulfoacrylonitrile | 4.8 |
| Sodium hydroxynitrilomonosulfonate | 0.8 |
| Sodium bisulfite | 2.4 |
| Sulfuric acid | 0.1 |
| Water | 1000 |

Retention time: 6.5 hours; temperature: 55° C.

RESULTANT POLYMER (A) composition:

|   | Percent |
|---|---|
| Acrylonitrile | 88.9 |
| Methyl acrylate | 10.3 |
| Sodium salt of α-sulfoacrylonitrile | 0.8 |

$[\eta]$: 1.42 (in dimethylformamide at 35° C.).

(B) composition:

|   |   |
|---|---|
| Acrylonitrile | 94.4 |
| Sodium salt of α-sulfoacrylonitrile | 3.6 |

Polymers (A) and (B) were blended at a ratio of 90:10, and the blended polymer was dissolved in 70% nitric acid at −5° C. The resulting dope was degassed, filtered, and spun into 31% nitric acid. The thus obtained fiber was washed with water, heat-stretched to 8 times in water at 98° C. and was dried. The resultant fiber was of 3.2 denier, and contained 89.8% acrylonitrile, 9.3% methyl acrylate, and 0.93% α-sulfoacrylonitrile. No milkiness was observed, and almost no decrease in Z value after steaming at 123° C. The fiber obtained without the addition of sodium salt of α-sulfoacrylonitrile in Example 8 was obviously milky, less lustrous, and stiff. On the other hand, a fiber containing sodium vinylsulfonate in the place of sodium salt of α-sulfoacrylonitrile in Example 8 showed poorer heat-stretchability which was limited to about 6 times at most. Moreover, it showed adherance to some extent, and the thermal stability of the fiber was not as good as that of Example 8.

*Example 9*

Acrylamide was used in the place of methyl-methacrylate in Example 7, polymerization and spinning was carried out in the same way. The resultant polymer contained 90.0% acrylonitrile, 5.7% acrylamide and 0.70% α-sulfoacrylonitrile, and $[\eta]=1.39$ in dimethylformamide at 35° C. The resultant fibre had excellent transparency and high whiteness and thermal stability, that is, Z value before and after steaming were 99 and 98 respectively. When dyed with Sevron Green B, the resultant fibre was a brilliant color.

*Example 10*

Two copolymers, (A) and (B), as described hereinafter, obtained in the same way as Example 7, were dissolved in 70% nitric acid at −5° C. at various concentration and a 16.3% polymer solution was obtained. After defoaming and filtering, said solution was spun into 31% nitric acid solution, washed with water completely, heat-stretched by 8 times in 0.01% phosphoric acid aqueous solution at 98° C. and dried overnight at 50° C. The results of measuring the properties of each resultant fibre are as follow:

RESULTANT POLYMER (A) composition:

|  | Percent by weight |
|---|---|
| Acrylonitrile | 94.8 |
| Methyl methacrylate | 5.5 |

$[\eta]$: 1.49 (in dimethyl formamide at 35° C.)

(B) composition:

|  | |
|---|---|
| Acrylonitrile | 83.9 |
| Methyl methacrylate | 5.3 |
| Sodium salt of α-sulfoacrylonitrile | 10.8 |

RESULTED FIBERS

| Blend (B)/(A) | 0/100 | 1/99 | 2/98 | 3/97 | 10/90 | 20/80 | 30/70 | 40/60 | 50/50 | 60/40 |
|---|---|---|---|---|---|---|---|---|---|---|
| α-sulfoacrylonitrile content (wt. percent) | 0 | 0.11 | 0.22 | 0.32 | 1.08 | 2.2 | 3.2 | 4.3 | 5.4 | 6.5 |
| Degree of adhesion | None | None | None | None | None | None | None | Slight | Considerable | Considerable |
| Milkiness | Considerable | Considerable | Slight | do | do | do | do | do | None | None |
| Whiteness (Z value) after steaming at 123° C. | 91 | 92 | 94 | 95 | 94 | 92 | 92 | 91 | 89 | 86 |
| Maximum hot-stretchability | 8.0 | 8.2 | 8.5 | 9.0 | 9.0 | 8.7 | 8.5 | 7.7 | 7.0 | 6.2 |

From the above results it is clear that blended compositions have as excellent property as copolymers and suitable ranges of α-sulfoacrylonitrile in the compositions are from 0.2% to 5%.

*Example 11*

Upon heating 20 g. ammonium α-sulfoacrylonitrile with 0.2 g. α, α'-azo-bis-isobutylonitrile in the presence of 100 g. water at 80° C., polymerization was accomplished in 5 hours. The polymer obtained was mixed with 4.8 l. surfuric acid aqueous solution of pH 3.0, 400 g. acrylonitrile, 2.0 g. α, α'-azo-bis-isobutylonitrile and 1.0 g. β-mercaptoethanol, and polymerized for 10 hours with refluxing.

After filtering, the resultant polymer was repeatedly washed with a great excess of water and dried. After refining a part of the resultant dried polymer with dimethylformamide and n-heptane, the α-sulfoacrylonitrile content in said polymer was analyzed.

Dried polymer composition: α-sulfonitrile 2.3%.

Refined polymer composition: α-sulfonitrile 0.06%.

210 g. said dried polymer was dissolved in 1 l. of 67% nitric acid at −5° C. and after defoaming, the solution was spun into 35% nitric acid. After washing with water, the resultant fibre was heat-stretched by 7 times in 100° C. hot water and dried at 70° C.

The fibre obtained was excellent in both whiteness and transparency, and yielded a brilliant red by dying with Sevron Red L.

What we claim is:

1. A composition comprising a copolymer of about 80 to 99.8% by weight of acrylonitrile, about 0.2 to 5% by weight of at least one component selected from the group consisting of α-sulfoacrylonitrile and water-soluble salts thereof and 0 to about 19.8% by weight of at least one component selected from other ethylenically unsaturated compounds.

2. A polymeric material according to claim 1, wherein said other ethylenically unsaturated compound is a member selected from the group consisting of methyl acrylate, methyl methacrylate, acrylamide and vinyl acetate.

3. A polymeric material according to claim 1, wherein the water-soluble salt of α-sulfoacrylonitrile is a member selected from the group consisting of sodium, potassium, magnesium, calcium, barium, aluminum, zinc and ammonium salts thereof.

4. A process for producing a polymeric material which comprises copolymerizing 80 to 99.8% of acrylonitrile, with 0.2 to 5% by weight of at least one member selected from the group consisting of α-sulfoacrylonitrile and water-soluble salts thereof and 0 to about 19.8% by weight of at least one other ethylenically unsaturated compound copolymerizable therewith, in an aqueous medium with a pH of 1.5 to 4.0 at a temperature of 20° to 800 C.

5. A process according to claim 4, wherein the polymerization is effected in the presence of a catalyst selected from the group consisting of α,α'-azo-bis-isolbutylonitriles, ammonium persulfate, alkali persulfate, ammonium chlorate, alkali chlorate, ammonium bisulfite, alkali bisulfite, ammonium hydroxynitrilomonosulfonate and alkali hydroxynitrilomonosulfonate.

6. A process according to claim 4 comprising spinning the polymeric material to produce a fiber.

7. A process according to claim 6 wherein said spinning is effected with nitric acid as a solvent.

References Cited by the Examiner

UNITED STATES PATENTS

| 2,601,256 | 6/1952 | Bruson | 260—513 |
| 3,043,811 | 7/1962 | Traylor et al. | 260—79.3 |

MURRAY TILLMAN, *Primary Examiner.*

SAMUEL H. BLECH, *Examiner.*

J. WHITE, *Assistant Examiner.*